(12) United States Patent
Geller

(10) Patent No.: US 12,507,882 B2
(45) Date of Patent: Dec. 30, 2025

(54) ADAPTIVE AND RADIALLY EXPANDING SPECULUM

(71) Applicant: RL3T LLC, Milwaukee, WI (US)

(72) Inventor: Arlette Geller, Milwaukee, WI (US)

(73) Assignee: RL3T LLC, Durham, NC (US)

( * ) Notice: Subject to any disclaimer, the term of this patent is extended or adjusted under 35 U.S.C. 154(b) by 190 days.

(21) Appl. No.: 18/150,790

(22) Filed: Jan. 5, 2023

(65) Prior Publication Data
US 2023/0218157 A1    Jul. 13, 2023

Related U.S. Application Data

(60) Provisional application No. 63/296,836, filed on Jan. 5, 2022.

(51) Int. Cl.
*A61B 1/303* (2006.01)
*A61B 1/32* (2006.01)

(52) U.S. Cl.
CPC ............. *A61B 1/303* (2013.01); *A61B 1/32* (2013.01)

(58) Field of Classification Search
CPC ... A61B 1/303; A61B 1/32; A61B 2017/0225; A61B 17/12145; A61B 17/12172; A61F 2002/825
See application file for complete search history.

(56) References Cited

U.S. PATENT DOCUMENTS

| | | |
|---|---|---|
| 5,342,385 A | 8/1994 | Norelli et al. |
| 6,302,861 B2 | 10/2001 | Tweddell, III et al. |
| 6,902,530 B1 | 6/2005 | Pianka |
| 7,549,982 B2 | 6/2009 | Carlin |
| 7,744,556 B2 | 6/2010 | Heuer et al. |
| 7,963,934 B2 | 6/2011 | Morrow |
| 8,096,945 B2 | 1/2012 | Buchok et al. |

(Continued)

FOREIGN PATENT DOCUMENTS

| | | |
|---|---|---|
| CA | 2487103 C | 2/2008 |
| EP | 0221424 A1 | 5/1987 |

(Continued)

OTHER PUBLICATIONS

International Search Report and Written Opinion for PCT/US23/60184, Jul. 10, 2023, 17 pages.

*Primary Examiner* — Julianna N Harvey
(74) *Attorney, Agent, or Firm* — Husch Blackwell LLP

(57) ABSTRACT

An adaptive and radially expanding speculum is provided. The speculum includes an expansor that is configured for being inserted into an orifice, exerting an outward force against an orifice wall, and retaining the orifice in an expanded state until it is removed. The expansor can take the form of a radial compression spring, and may be adapted for transitioning between at least a compressed state, a partially expanded (or partially compressed) state, and an equilibrium state. The expansor may include generally longitudinally extending members located between proximal transition portions and distal transition portions. The proximal and distal transition portions may include spring characteristics that cause the expansor to exert force on the orifice when it is inserted therein. The speculum may further comprise a drawstring which, when pulled, reduces a cross section of at least a portion of the expansor such that it may be removed from the orifice.

11 Claims, 16 Drawing Sheets

(56) References Cited

U.S. PATENT DOCUMENTS

| | | |
|---|---|---|
| 8,613,718 B2 | 12/2013 | Karapasha et al. |
| 9,326,857 B2 | 5/2016 | Cartledge et al. |
| 10,842,371 B2 | 11/2020 | Recanati et al. |
| 2009/0283099 A1 | 11/2009 | Harmanli |
| 2011/0034776 A1 | 2/2011 | Dixon et al. |
| 2012/0130178 A1 | 5/2012 | Hartoumbekis et al. |
| 2013/0060095 A1 | 3/2013 | Bouquet |
| 2014/0052018 A1* | 2/2014 | Hawkins ................ A61B 17/42 600/562 |
| 2016/0166282 A1* | 6/2016 | Juravic ................... A61B 1/31 606/121 |
| 2017/0181607 A1 | 6/2017 | Lalli et al. |
| 2017/0215885 A1* | 8/2017 | Goldie ..................... A61F 2/82 |
| 2019/0133431 A1 | 5/2019 | Bouquet |
| 2019/0335989 A1 | 11/2019 | Swift et al. |
| 2021/0353443 A1* | 11/2021 | King ..................... A61F 2/2418 |
| 2021/0369100 A1 | 12/2021 | Munoz |
| 2022/0151594 A1 | 5/2022 | Inoue et al. |

FOREIGN PATENT DOCUMENTS

| | | |
|---|---|---|
| KR | 101317984 B1 | 10/2013 |
| WO | 2010120282 A1 | 10/2010 |

\* cited by examiner

ADAPTIVE AND RADIALLY EXPANDING SPECULUM

CROSS-REFERENCE TO RELATED APPLICATIONS

This application claims priority to U.S. Provisional Patent Application No. 63/296,836 entitled "Adaptive and Radially Expanding Disposable Speculum," filed Jan. 5, 2022, the entire disclosure of which, including the specification and drawings, is incorporated herein by reference.

BACKGROUND OF THE INVENTION

Speculums have a variety of uses, including use in inspecting and visualizing orifices on humans and animals. These speculums may expand such orifices to allow a user to further examine such orifice and visualize potential concerns and issues.

One common type of speculum is a vaginal speculum, which typically includes an instrument that allows dilation of the vaginal walls for internal genital organs examination. Current speculum designs, which may be constructed of metal or plastic, often include two hinged blades and a handle. The two blades are "closed" when the speculum is inserted to facilitate its entry and "opened" in its final position where they can be fixed in position by a screw mechanism or the like. In addition to hinges, currently known speculums can also include joints, edges, and other structure that can cause discomfort in patients when in contact with the body. The blades of these speculums can also hinder proper visualization or specimen collection. Moreover, the resulting shape created by the speculums, when widened or opened, does not necessarily reflect the generally cylindrical shape of the anatomy and lacks the ability to retain the vaginal walls from covering the visual field to accurately examine the cervix. Moreover, speculums may be made of opaque, solid materials and may prevent a user from visualizing the majority of the orifice.

In addition, body size and shape varies from patient to patient. However, currently known speculums are not able to adapt to such different sizes and shapes. Because of this, many examinations cannot occur due to the incorrect size of the speculum that is available. Additionally, many users struggle to examine an orifice when using a speculum assembly, as the users are required to maintain the speculum assembly at a desirable location and position and are unable to use and access both hands during the examination process. Further yet, currently known speculums must be administered and be put into place by a second person (e.g., physician or other healthcare provider). Finally, with currently known speculums, there is a need for sanitation and concerns of cross-contamination exist between patients even after sterilization of the speculum.

Accordingly, a need exists for a speculum that allows for maximum visibility, improved comfort, adaptability to various anatomy sizes and shapes, enhanced ability to collect specimens, operation with one hand including by a patient, and adaption for single use.

BRIEF SUMMARY OF THE INVENTION

The present invention is directed generally to a speculum that includes an expansor. The expansor can be configured to exert an outward force against an orifice into which it is inserted, gradually expand the orifice upon insertion into the orifice, and retain the orifice in an expanded state until the expansor is removed from the orifice. The expansor may include a plurality of proximal transition portions, a plurality of distal transition portions, and a plurality of generally longitudinal sections, wherein each longitudinal section extends between a respective proximal transition portion and a respective distal transition portion. In expanding and retaining the orifice, at least the longitudinal sections are configured for engaging a wall of the orifice. It will be appreciated that the expansor is radially expending and contracting. In that regard, the expansor can form a radial compression spring that can be radially compressed when an inward radial force is exerted thereon. It also is adapted for exerting outward radial force, for example when placed in an orifice.

The expansor can be configured for transitioning between at least (a) a compressed state wherein the expansor has a first cross section or first cross-sectional area, (b) a partially expanded (or partially compressed) state wherein the expansor has a second cross section or second cross-sectional area, and (c) an equilibrium or expanded state wherein the expansor has a third cross section or third cross-sectional area. The second cross-sectional area is greater than the first cross-sectional area, and the third cross-sectional area is greater than the second cross-sectional area. It will be understood that the expansor may undergo a continuum of degrees of compression and expansion occurring between its fully compressed state and its fully expanded state.

The speculum may further include an extraction mechanism that may have a drawstring which, when pulled, engages the proximal transition portions and reduces a cross section of at least a portion of the expansor such that it may be removed from the orifice.

Another embodiment of the present invention is directed generally to a speculum assembly. The assembly may be made up of an expansor (as described above) and an applicator. The applicator may be made up of an outer tube and an inner plunger received at least partially within the tube. The tube is configured for receiving the expansor in a compressed state and inserting it into an orifice in a partially expanded state. The plunger is at least partially inserted into the tube and configured for pushing the expansor into the orifice. The plunger is selectively movable between an extended position when the expansor is fully located within the tube, and at least a partially retracted position when the expansor is being inserted into the orifice. It will be understood that the expansor is in a compressed state when it is located in the applicator tube, and can be in a partially expanded state when it is located in the orifice.

A further embodiment of the present invention is directed to a method of using a speculum assembly to expand an orifice. The method may include the steps of providing a speculum assembly (as described above), inserting the applicator tube into the orifice, pushing the plunger at least partially into the applicator tube in order to push the expansor into the orifice, and removing the applicator tube from the orifice once the expansor has been inserted into the orifice. Once in the orifice, the expansor is expanded to a partially expanded state to engage and expand the orifice. The method may further comprise the step of removing the expansor from the orifice by pulling a drawstring attached to the expansor, wherein pulling the drawstring reduces a cross section of at least a portion of the expansor.

Objects and advantages pertaining to the mounting assembly for an adaptive and radially expanding disposable speculum may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

Figure 1:
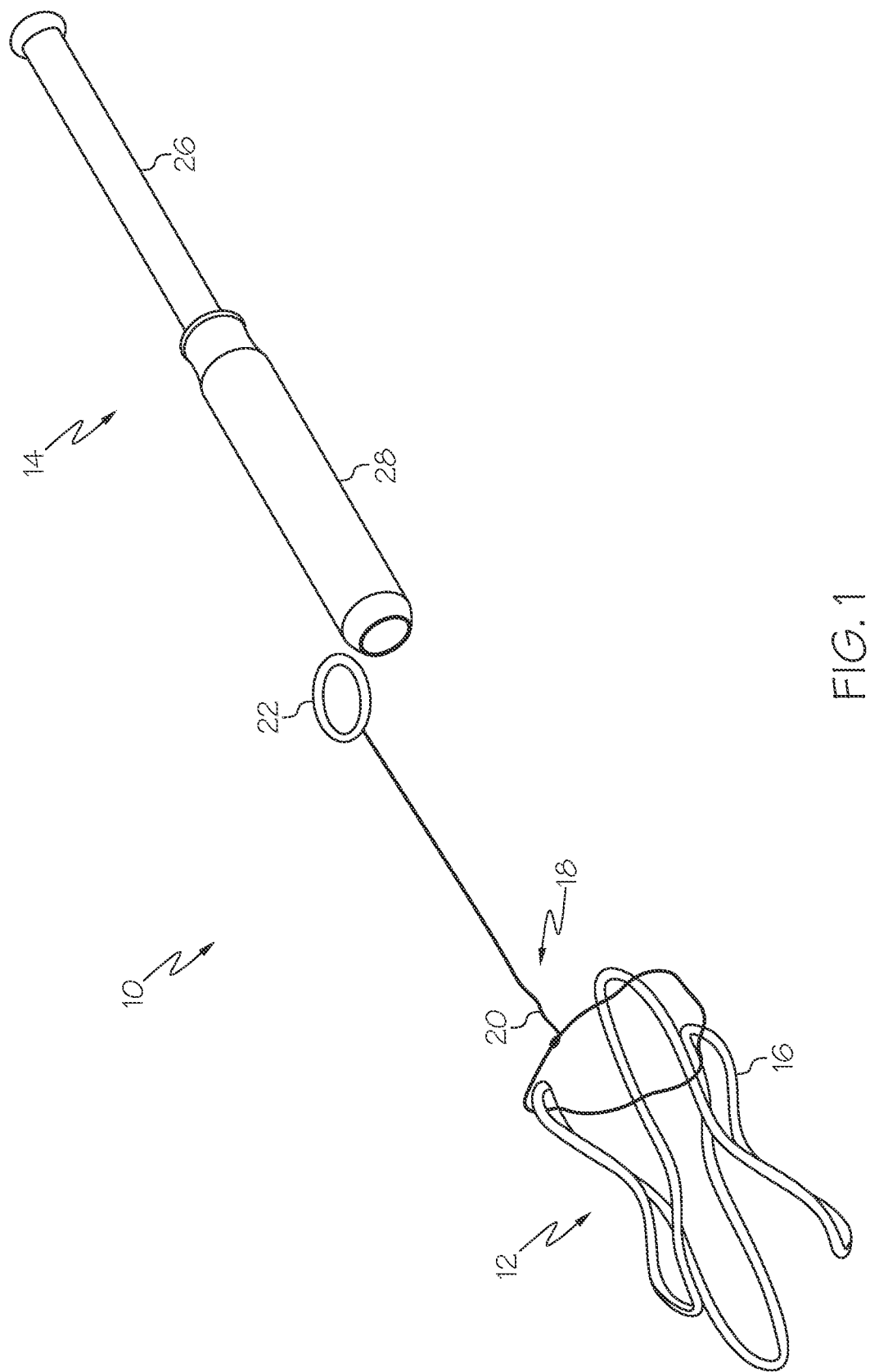
FIG. 1 is an exploded perspective view of a speculum assembly including a speculum and an applicator in accordance with one embodiment of the present invention.

Various embodiments of the present invention are described and shown in the accompanying materials, descriptions, instructions, and drawings. For purposes of clarity in illustrating the characteristics of the present invention, proportional relationships of the elements have not necessarily been maintained in the drawings. It will be understood that any dimensions included in the drawings are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 2:
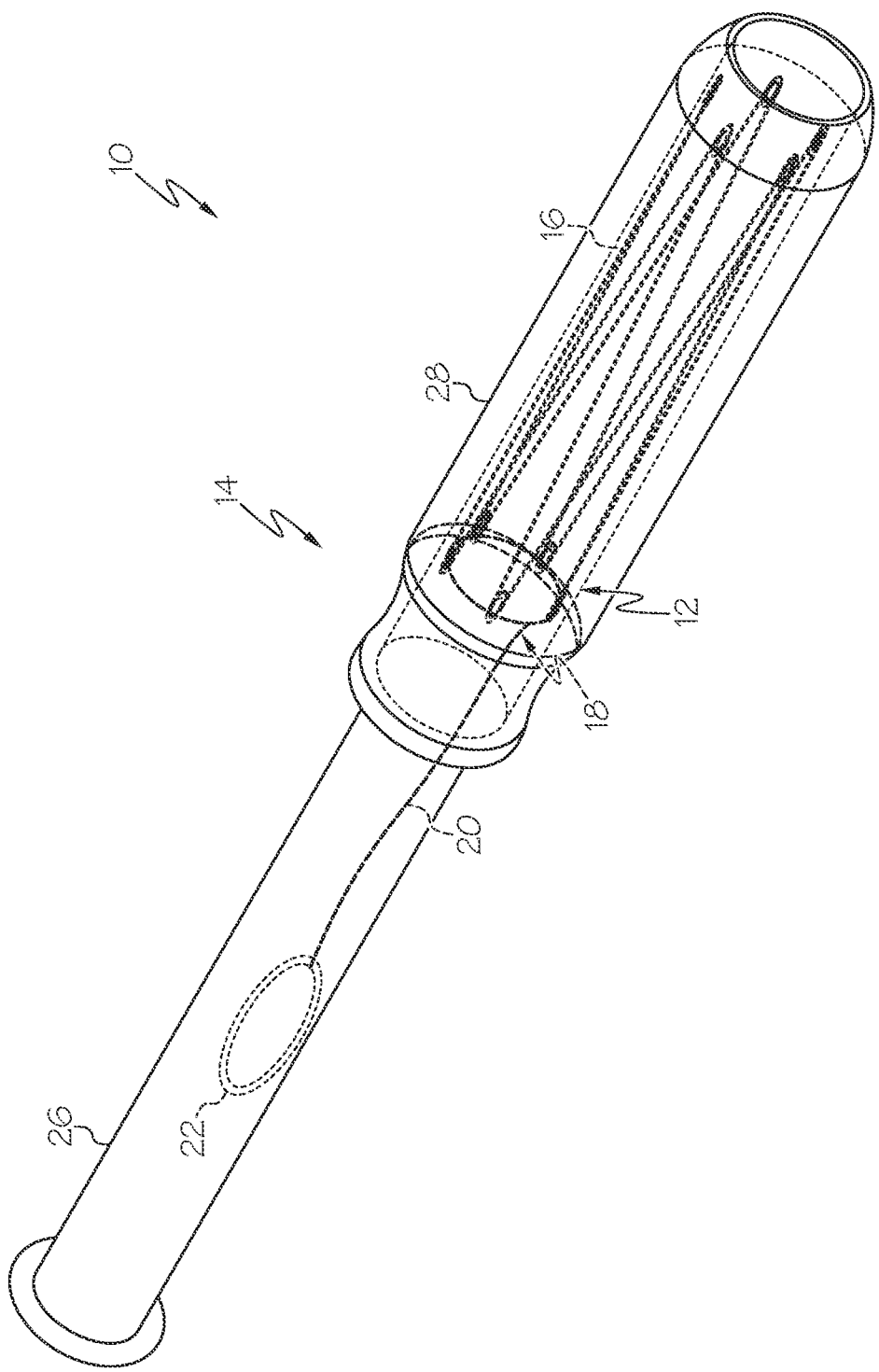
FIG. 2 is an assembled perspective view of a speculum assembly including a speculum and an applicator in accordance with one embodiment of the present invention.

The present invention is directed generally to an improved speculum, applicator assembly, and method of using same. The speculum assembly 10, as best shown in FIGS. 1-2 and as described herein, may include a speculum 12 and an applicator 14. The speculum 12 may include an expansor 16 and an optional attached extraction mechanism 18. According to various embodiments, the extraction mechanism 18 includes a drawstring 20 attached to a loop 22. A user may remove the expansor 16 from an orifice 24 after insertion by using the extraction mechanism 18, as will be discussed in further detail below.

As shown in FIG. 1, the speculum 12 may be inserted and deployed in an orifice 24 by an applicator 14. The applicator 14 may include a plunger 26 and an outer tube 28. The plunger 26 may have a smaller diameter than the diameter of the outer tube 28, such that the plunger 26 fits within the outer tube 28. According to one embodiment, the plunger 26 is inserted into a base 30 of the outer tube 28, as shown in FIG. 2. When the speculum assembly 10 is combined, the expansor 16 may be placed within the outer tube 28 while the extraction mechanism 18 hangs into and through the plunger 26.

Figure 3A:
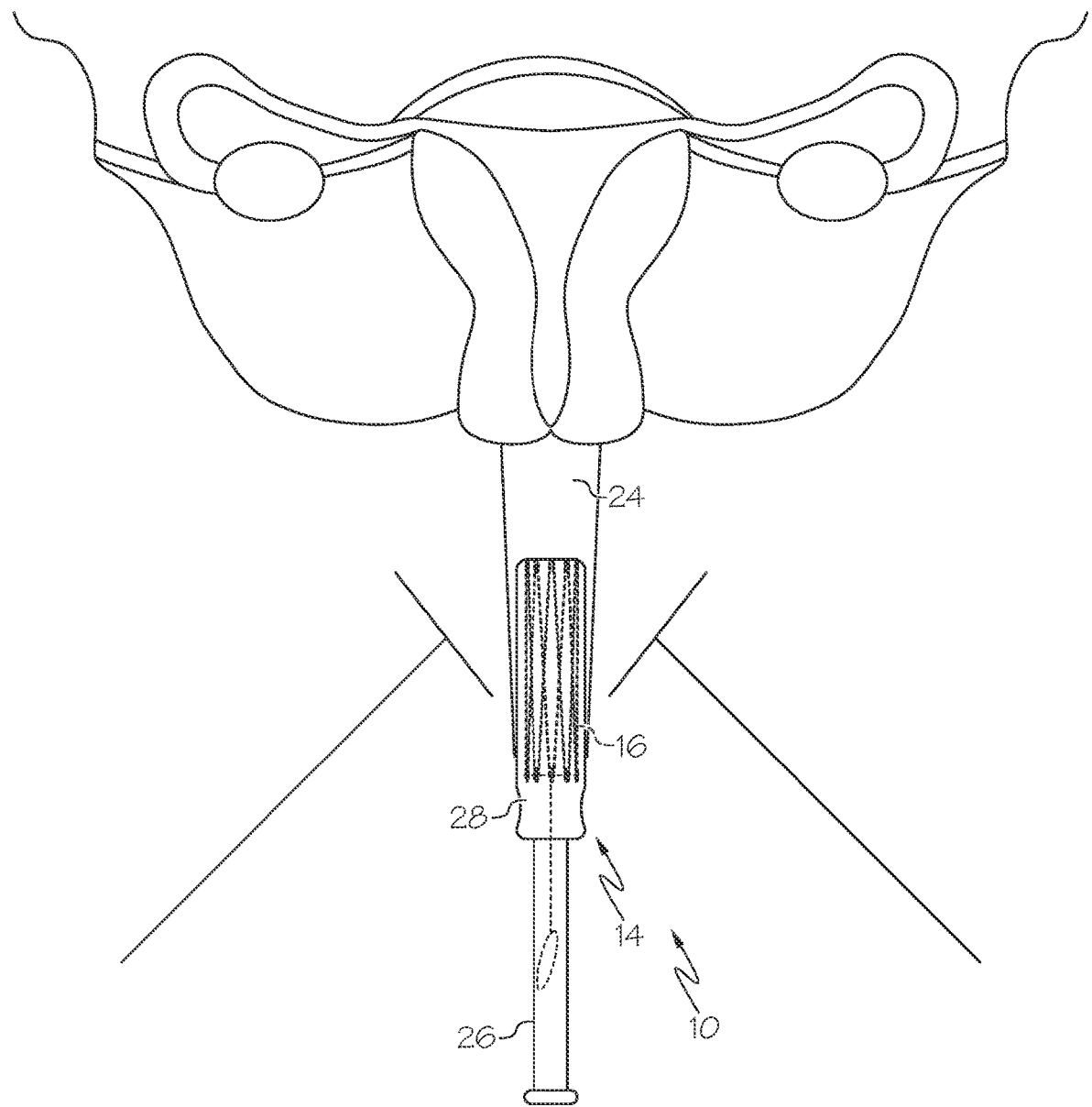
FIG. 3A is a first perspective view of the speculum assembly in operation, illustrating the applicator plunger in a fully extended position and the speculum located fully within the applicator in accordance with one embodiment of the present invention.

Turning now to FIGS. 3A-3D, the speculum assembly 10 may be used to insert the expansor 16 into an orifice 24. Although not limiting, the orifice 24 may be a vaginal canal as shown. It will be appreciated that the speculum assembly 10 may be used in a wide variety of other applications, and that the expansor 16 may be used in connection with other orifices, openings, incisions, or surgical sites, including in both humans and other animals. For illustrative purposes, FIGS. 3A-3D illustrate the steps by which the expansor 16 is inserted into the orifice 24, when the orifice 24 is a vaginal canal. As shown in FIG. 3A, the speculum assembly 10 may be placed within an orifice 24 when the speculum assembly 10 is combined as discussed with reference to FIG. 2. The transparency of the speculum assembly 10 in FIG. 3A is for illustrative purposes and shall not be construed as limiting.

Figure 3B:
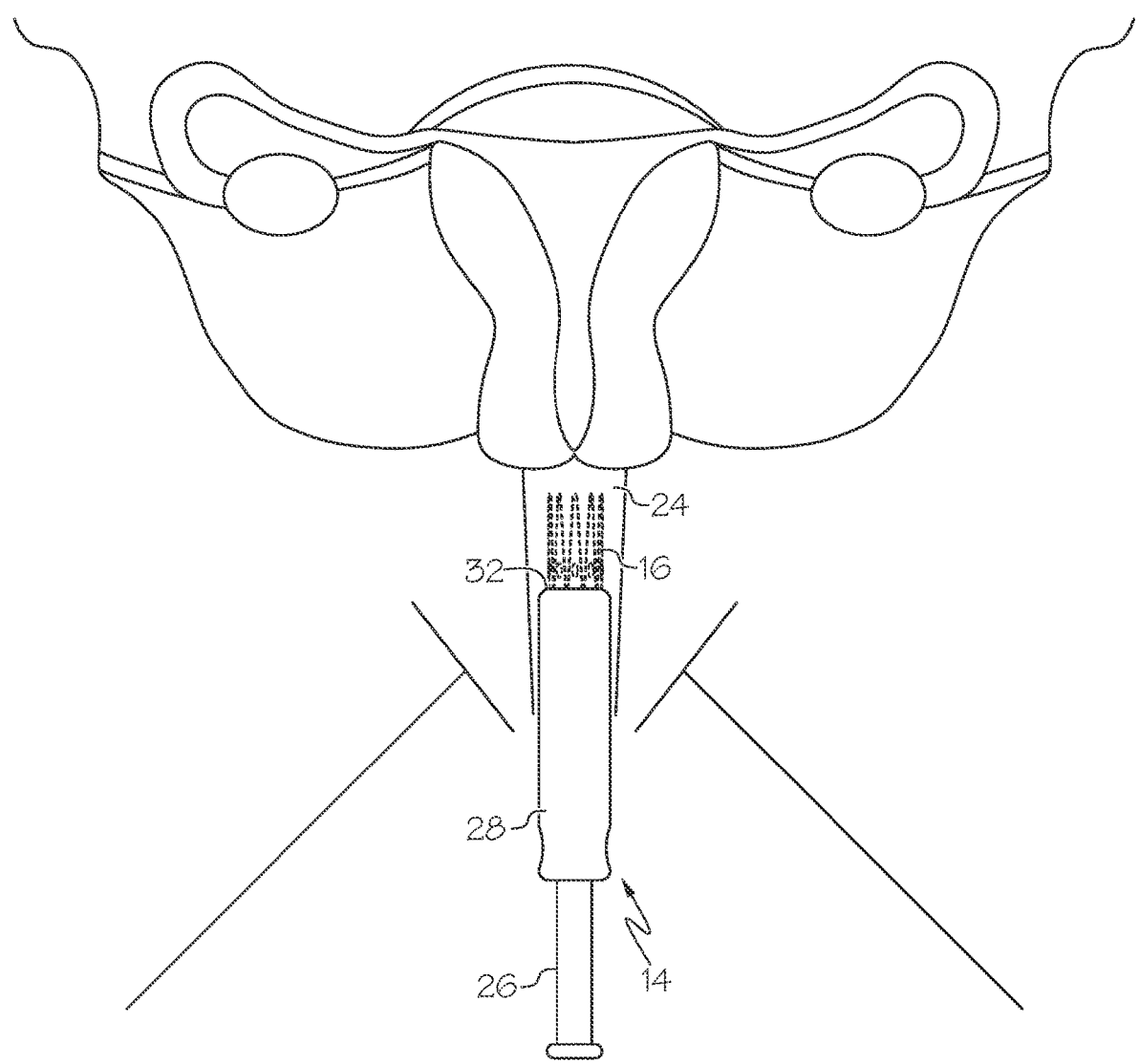
FIG. 3B is a second perspective view of the speculum assembly in operation, illustrating the applicator plunger in a partially retracted position and the speculum located partially within and partially extending from the applicator in accordance with one embodiment of the present invention.
Figure 3C:
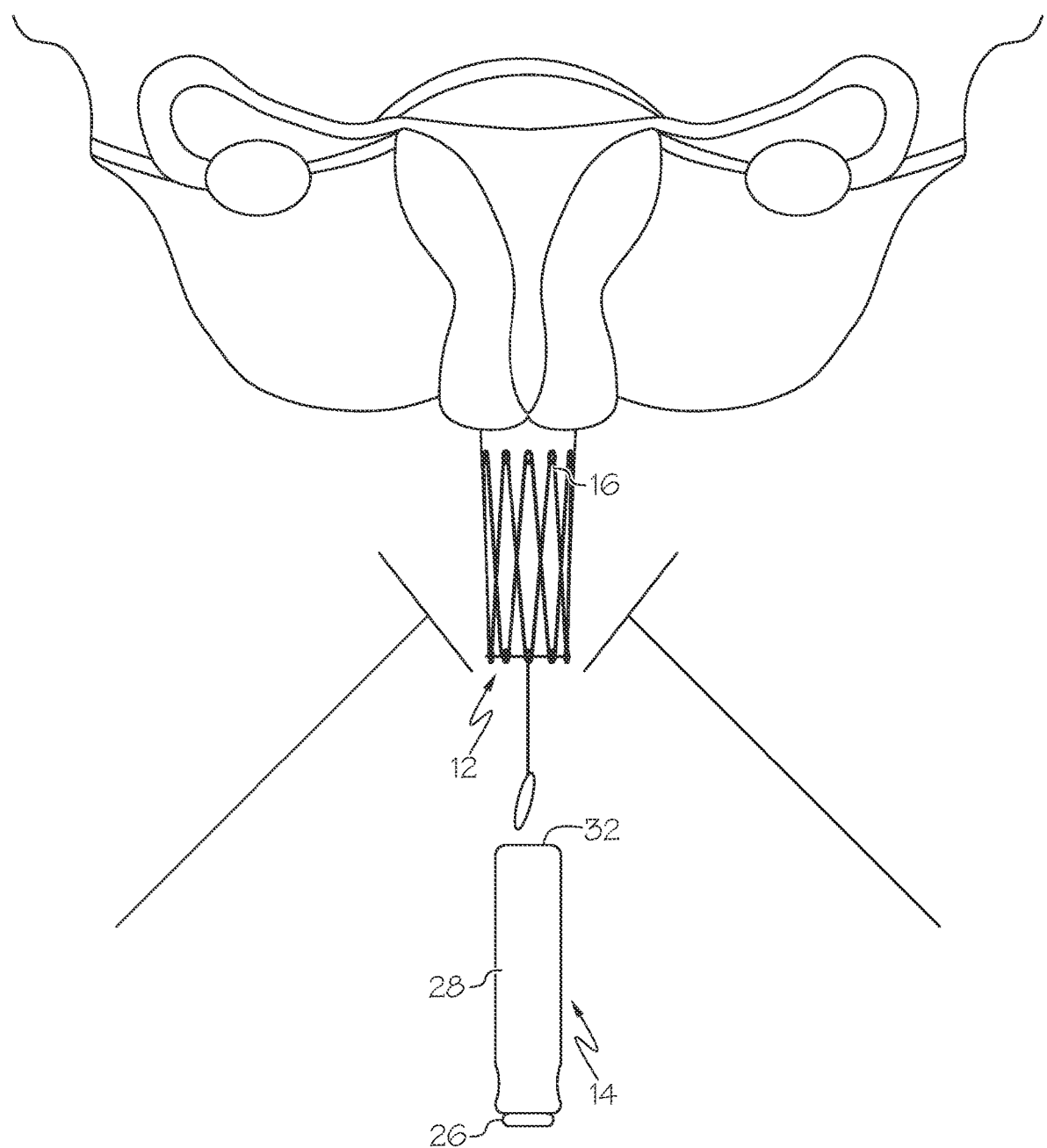
FIG. 3C is a third perspective view of the speculum assembly in operation, illustrating the applicator plunger in a fully retracted position and the speculum located entirely within the patient in accordance with one embodiment of the present invention.

The outer tube 28 of the applicator 14 may be placed within the orifice 24, such that the expansor 16 is fully or partially received within the orifice 24. When the outer tube 28 is being inserted, the plunger 26 may be in a fully extended position and the expansor 16 may be located fully within the applicator 14, as demonstrated in FIG. 3A. When located within the applicator 14, the expansor 16 is an a contracted or loaded (i.e., spring-loaded) orientation. The plunger 26 may then be pushed into and toward the outer tube 28, as shown in FIG. 3B. As the plunger 26 is pushed into the outer tube 28, the expansor 16 is pushed out of a distal end 32 of the applicator 14. Turning to FIG. 3C, the speculum 12 may be completely removed from the applicator 14 through the distal end 32 upon the plunger 26 being fully inserted into the outer tube 28. As the expansor 16 exits the applicator 14, it expands from a compressed state (as dictated by the size of the applicator) to a partially expanded state (as dictated by the size and force exerted by the orifice). It will be understood that the natural or equilibrium state of the expansor 16 is an expanded orientation (having an expanded cross section or diameter). In this regard, the expansor 16 will exert a force against the orifice 24 (e.g., against the vaginal wall or canal) that causes that orifice 24 to expand and be retained in a manner that may allow for an examination or procedure. In other words, when inserted within an orifice 24, the expansor 16 can be in a partially contracted or loaded orientation (i.e., in an orientation somewhere between its fully contracted/loaded orientation and its fully extended/free orientation). When the expansor 16 is removed from the applicator 14 and is fully submerged within the orifice 24, a user may be able to visualize the orifice 24 without obstruction.

Figure 3D:
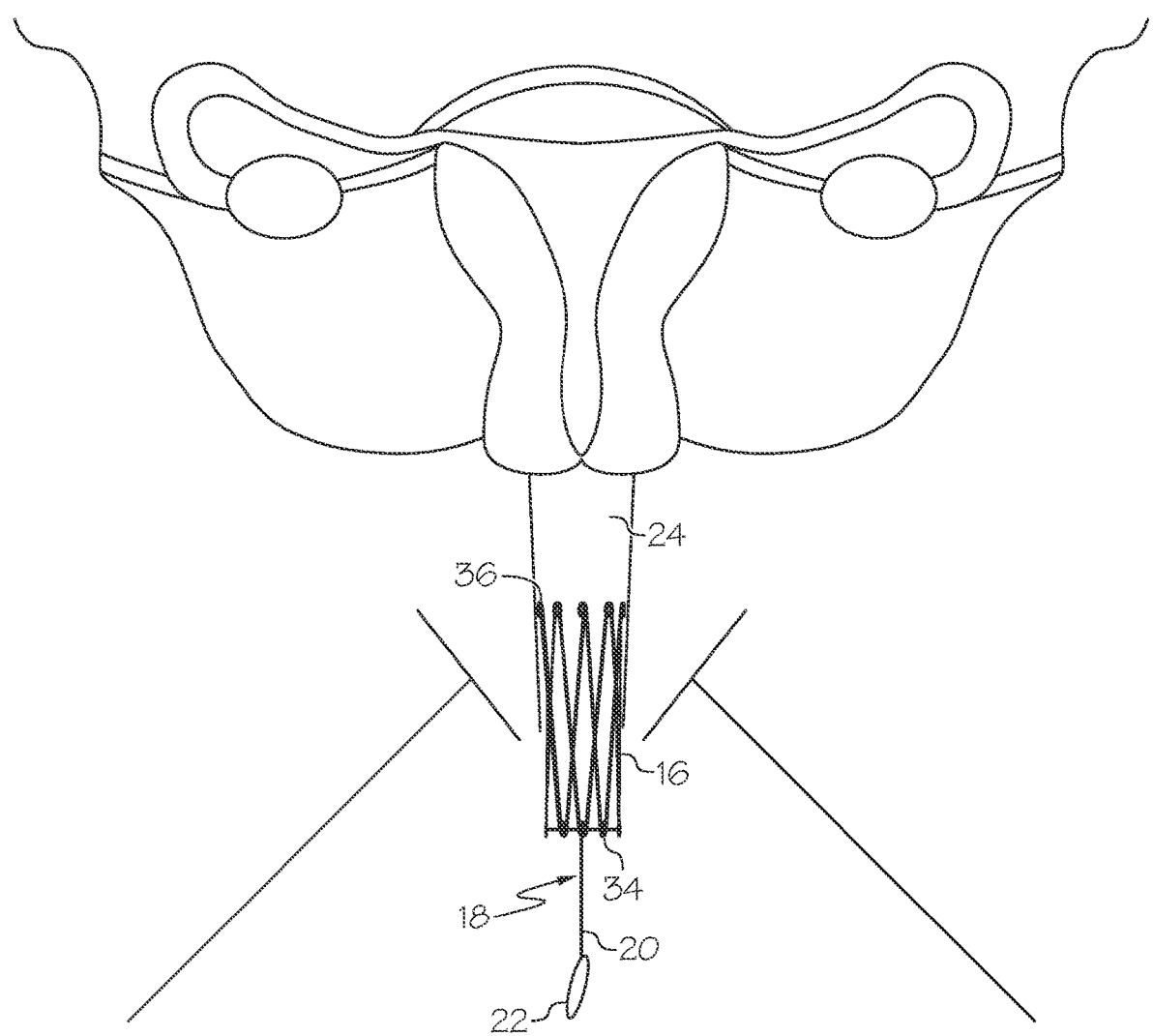
FIG. 3D is a fourth perspective view of the speculum assembly in operation, illustrating the drawstring of the speculum being pulled in order to reduce the diameter of the expansor during removal from the patient in accordance with one embodiment of the present invention.

As shown in FIG. 3D, the expansor 16 may be removed from the orifice 24 via an optional extraction mechanism 18. The extraction mechanism 18 may comprise any suitable means for compressing at least one portion of the expansor 16, or compressing the entire expansor 16, in order to facilitate the removal of the expansor 16 from the orifice 24. It will be appreciated that the extraction mechanism 18 may include one or more flexible components, one or more rigid components, and/or any suitable combinations thereof. In one embodiment, the extraction mechanism 18 includes a drawstring 20. The drawstring 20 may be in the form of a string, thread, cord, cable, ribbon, or other suitable structure, and may be constructed of any suitable material. According to one embodiment, a loop 22 may be positioned at a terminal end of the drawstring. When the drawstring 20 is engaged, the lower portion 34 of the expansor 16 may be retracted or tightened. When the lower portion 34 is retracted or tightened, the diameter or cross-sectional shape of the lower portion 34 may be smaller than the diameter or cross-sectional shape of the upper portion 36 of the expansor 16. In this configuration, the expansor 16 may take on a generally frustoconical shape. When compressed by the drawstring 20 or otherwise, the expansor 16 may be removed by gradually sliding it out of the orifice 24.

The speculum 12 may be fully removed from the orifice 24 and placed into the applicator 14 in a manner as shown in FIG. 2. A user may desire to place the speculum 12 back into the applicator 14 in order to ship the speculum assembly 10 to an examination or testing location. For example, when used in the gynecological context, a physician may use the speculum assembly 10 to examine a patient's vagina and cervix. According to one embodiment, the expansor 16 may collect a specimen or sample from a patient, which may be valuable for testing purposes. The specimen or sample may be collected either via the expansor 16 itself or via an associated reservoir or container. The physician may desire to send the expansor 16 with collected specimen to a testing facility. Using the speculum assembly 10 described herein, the physician can easily store the speculum 12 within the applicator 14 in a combined speculum assembly 10 and ship such speculum assembly 10 to a relevant testing facility or laboratory. In other embodiments, the expansor 16 may be placed in a separate container.

The expansor 16 may be made of various materials, including a polymer material (e.g., polypropylene, polyester, polyethylene, acrylic, polycarbonate, polyamide, polystyrene, or the like), metallic material, plastic material, rubber material, composite material, and/or combinations thereof. In one embodiment, the expansor 16 is made of a flexible material. The expansor 16 may include a coating, such as a silicone material coating. For example, in one embodiment, the expansor 16 may be made from a composite construction comprising an interior wire core having an exterior polymer coating. When the expansor 16 is applied to an orifice 24, the silicone coating may prevent damage and pain to the inside of the orifice 24. This may prevent further physical and psychological damage to the individual or animal to which the expansor 16 is being applied. According to various embodiments, the silicone coating decreases risk of injury to the patient. The silicone coating may further eliminate the potential for infection or cross-contamination between patients, as the expansor 16 may be easily cleaned and disinfected. In one embodiment, the expansor 16 may include a porous or absorbent material or coating such that it is adapted for collecting samples or specimens when inserted into an orifice 24, which may subsequently be sent to a laboratory for analysis. In another embodiment, the expansor 16 may include one or more channels for collecting samples or specimens, such as a fluid.

According to various embodiments, the expansor 16 may take on various shapes, sizes, and other structural characteristics. The size of the expansor 16 may be dependent on the size of the individual or animal that the speculum assembly 10 is being used on. In one embodiment, the expansor 16 may be selected from a set of expansors, based on a desired size, shape, cross section, diameter, length, strength, exerted force and/or any other relevant factors. For example, when an orifice 24 is smaller, a user may use an expansor 16 that is smaller than an expansor 16 used for a larger orifice 24. According to one embodiment, the expansor 16 may be spring-loaded such that it only expands to the size of the orifice 24 in which it is applied. The expansor 16 may be adaptable to the circumferential size of the orifice 24 and may exert the force only necessary for the size of the orifice 24. It will also be appreciated that the expansor 16 may be selected based on the force required to open and retain an orifice 24 at a desired diameter. In one embodiment, the expansor 16 is adapted for providing both vertical opening and lateral vaginal wall retention, thereby facilitating pelvic exams that mat be easier for practitioners and more comfortable for patients.

Figure 4A:
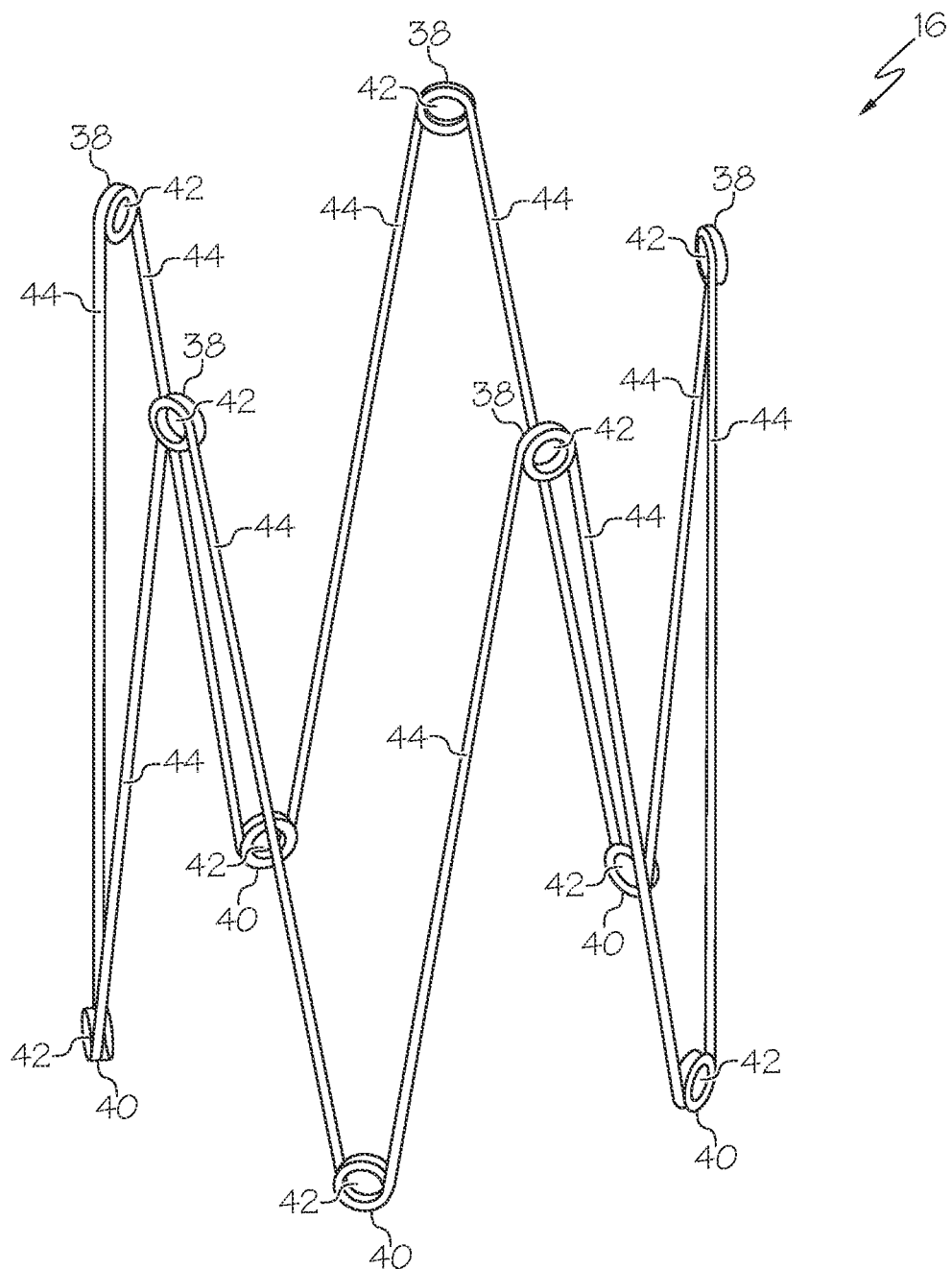
FIG. 4A is a perspective view of an expansor, illustrating the expansor in a generally expanded orientation in accordance with one embodiment of the present invention.
Figure 4B:
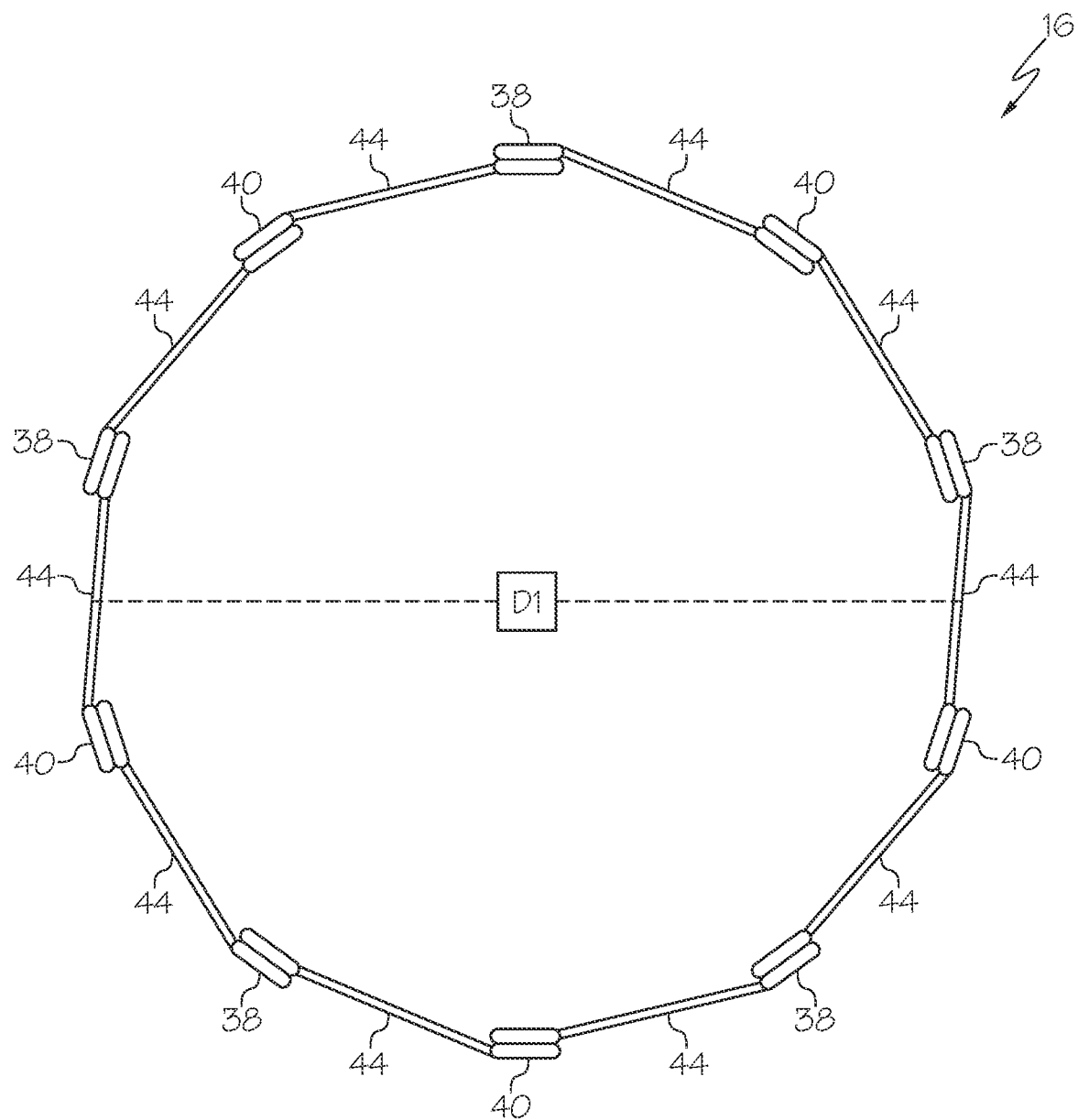
FIG. 4B is a top view of the expansor of FIG. 4A.

According to one embodiment, and as illustrated in FIGS. 4A-4B, the expansor 16 may have a generally cylindrical cross section. However, as described below, other suitable expansor cross sections are also within the scope of the present invention. The expansor 16 may take the form of a radial compression spring configured to expand and contract in a generally radial orientation. As such, the expansor 16 can be configured for applying an outward or radial pressure and/or exerting an outward or radial force against an orifice 24 into which it is inserted.

As shown, the expansor 16 may include a plurality of distal or upper transition portions 38 and a plurality of proximal or lower transition portions 40, with generally longitudinal sections 44 extending therebetween. Depending upon its orientation, the distal transition portions 38 may be referred to as forming peaks and the proximal transition portions 40 may be referred to as forming valleys. In one embodiment, the distal and proximal transition portions 38 and 40 may each form a curved portion and may optionally include coils or loops 42. Each individual loop 42 may generally take the form of a torsion spring. In other embodiments, the distal and proximal transition portions 38 and 40 may each include a curved portion formed generally of a u-shaped or a v-shaped curved section or bend and do not include any such coils or loops 42 (as best demonstrated in FIGS. 7A-8B). According to one embodiment, the expansor 16 has between four and eight (or more) distal transition portions 38 and a corresponding or equal number of proximal transition portions 40. However, it will be appreciated that any suitable number of distal and proximal transition portions 38 and 40 may be included. In FIG. 4A, the expansor 16 has five distal transition portions 38 and proximal transition portions 40.

When the expansor 16 is an a fully or partially contracted or loaded orientation or state (e.g., when in an applicator 14 or in an orifice 24), portions of the expansor 16 store energy (in the form of elastic potential energy) therein. In some embodiments, the deflection of the curved distal and proximal transition portions 38 and 40 results in elastic potential energy being stored in those sections. When the expansor 16 is not allowed to return to its equilibrium or fully expanded orientation, for example because it has been inserted into an orifice 24, the expansor 16 exerts a spring force against the walls of the orifice 24 (and vice versa) and the orifice 24 can be expanded due to such force.

Factors such as the cross section of the expansor 16, number of distal and proximal transition portions 38 and 40 (e.g., peaks and valleys), type of material, thickness of the material, diameter of the material, and the number of turns in each optional loop, among others, dictate the expansor's 16 spring rate and/or degree of force the expansor can exert when placed in an orifice (e.g., force generated against an orifice wall). To that end, it will be appreciated that the material thickness, material diameter, and/or material composition of the expansor 16 need not be uniform throughout the expansor 16. For example, the distal and proximal transition portions 38 and 40 may be of a different thickness or different material makeup as compared to the generally longitudinal sections 44. Further, in one embodiment, the cross sections or diameters of the two ends of the expansor 16, when in a natural or equilibrium state, may differ from one another. For example, such cross section or diameter of the proximal end may be either larger or smaller than the cross section or diameter of the distal end. In one embodiment, this results in the expansor 16 having a generally frustoconical shape when in its equilibrium state. Such a shape can assist in retaining the expansor 16 in its desired location within the orifice 24 even as muscles or tissue around the orifice 24 may contract thereby exerting additional force or pressure onto the expansor, which may otherwise result in it moving within or out of the orifice 24.

Figure 5A:
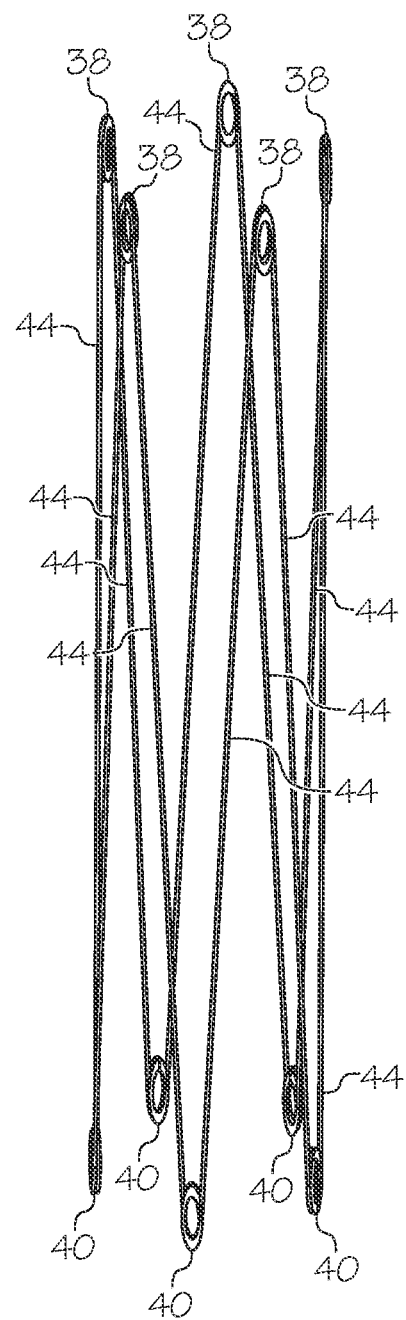
FIG. 5A is a perspective view of an expansor, illustrating the expansor in a generally contracted orientation in accordance with one embodiment of the present invention.
Figure 5B:
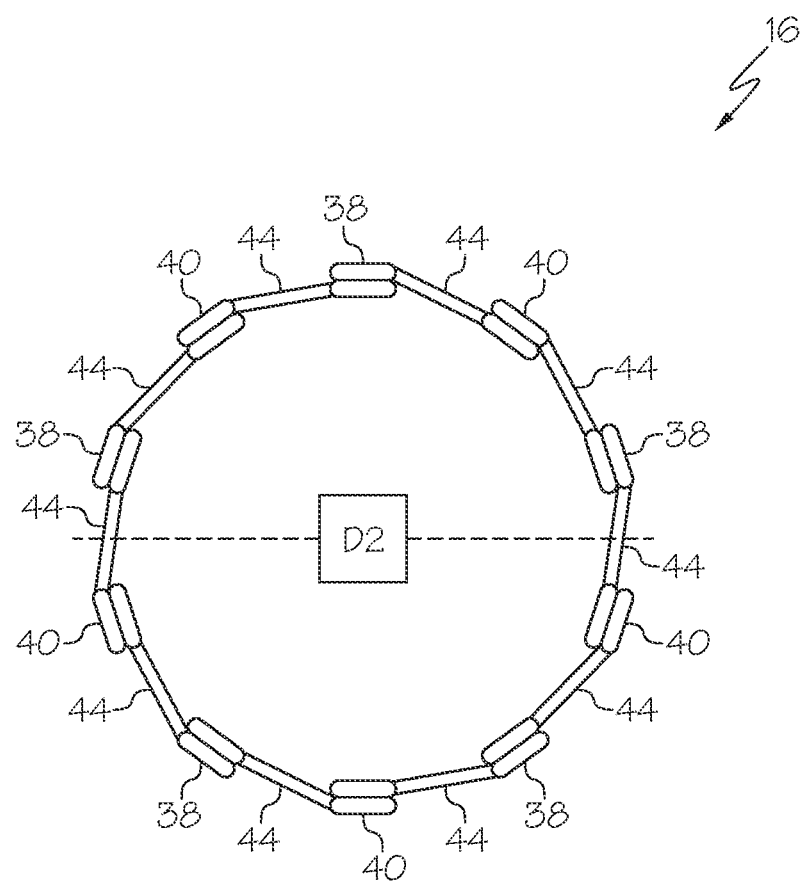
FIG. 5B is a top view of the expansor of FIG. 5A.

When in an expanded or equilibrium state, the expansor 16 may have a generally cylindrical cross section, as shown in FIG. 4B, and have a diameter D1. In one embodiment, when the expansor 16 is in an expanded state, the diameter D1 may range from 55 to 70 mm. Of course, depending upon the desired application, the expanded diameter D1 may be greater or less than this range. The expansor 16 may be forced into a compacted or loaded orientation, as illustrated in FIG. 5A. When in a compacted or retracted orientation, the expansor 16 may have a diameter D2, as shown in FIG. 5B, which is smaller than the expanded diameter D1 of FIG. 4B. In one embodiment, when the expansor 16 is in a compact state, the diameter D1 may range from 15 to 25 mm. Again, depending upon the desired application, the expanded diameter D1 may be greater or less than this range. Accordingly, such mentioned sizes are exemplary only, and the diameters D1 and D2 may be any size. Furthermore, it will be appreciated that the expansor 16 may take on a number of suitable cross sectional shapes including round, triangular, square, polygonal, irregular polygonal, or any other suitable shape. The expansor 16 may have a height of 90 to 150 mm; however, the height of the expansor 16 may be more or less than that which has been described.

Figure 6A:
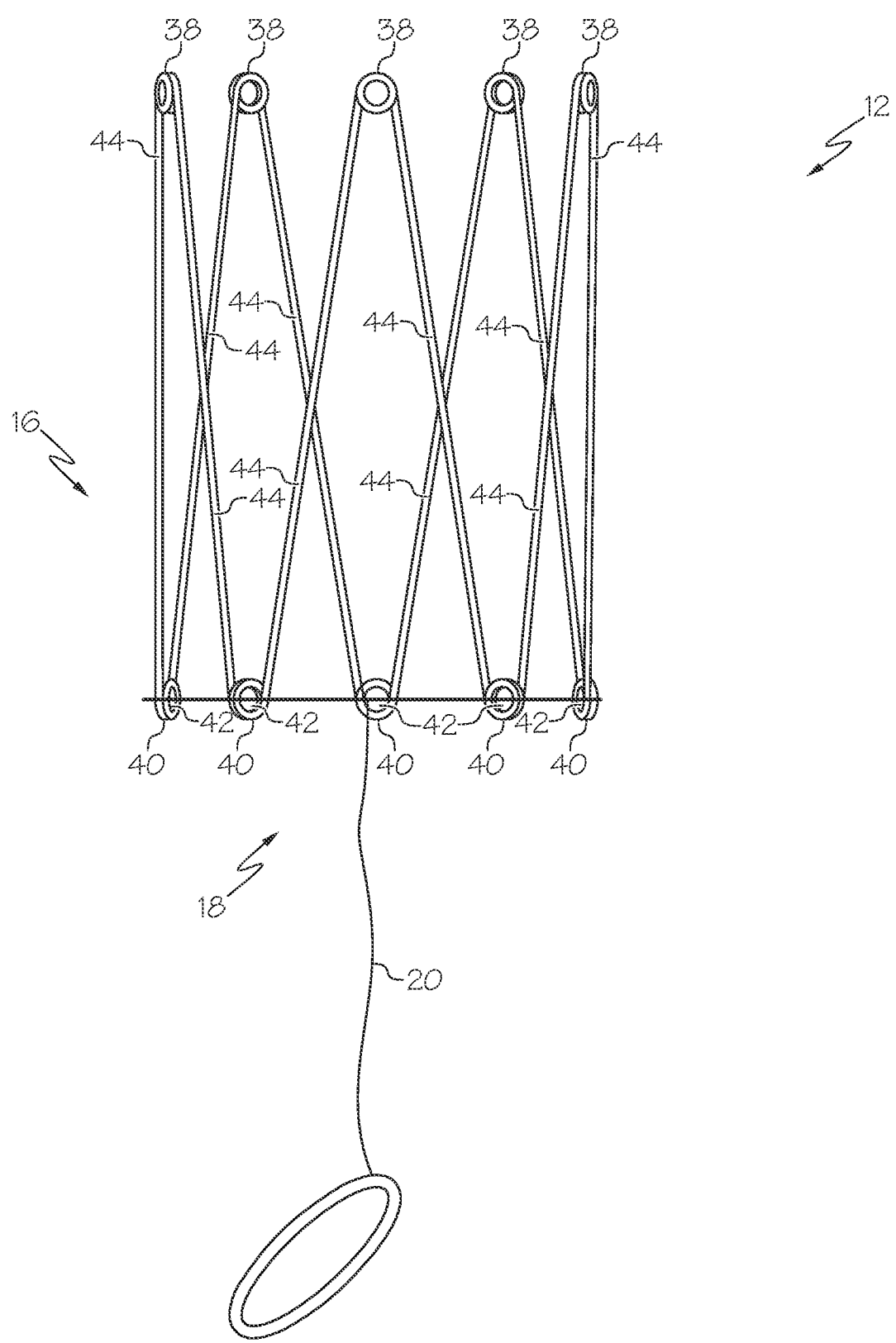
FIG. 6A is a side view of a speculum including an expansor and an extraction mechanism in accordance with another embodiment of the present invention.
Figure 6B:
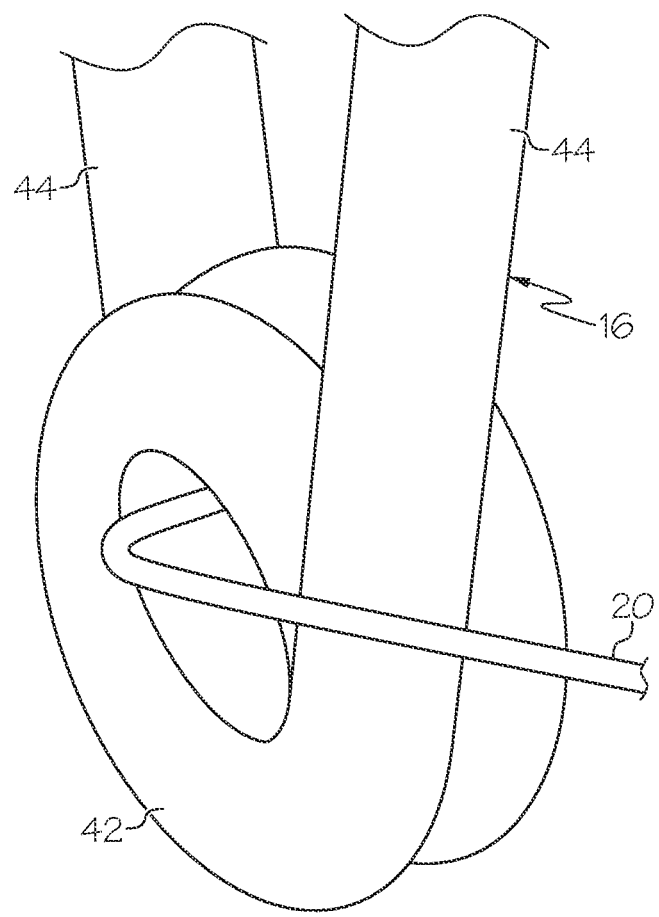
FIG. 6B is a partial enlarged view of the speculum of FIG. 6A.

According to various embodiments and as shown in FIG. 6A, the extraction mechanism 18 may be attached to the expansor 16 via loops 42 located at the valleys 40 of the expansor 16. The drawstring 20 of the extraction mechanism 18 may be fed through the loops 42 located on the valleys 40 of the expansor 16 in a manner as shown in FIG. 6B, such that the drawstring 20 connects to the expansor 16 via the loops 42.

Figure 7A:
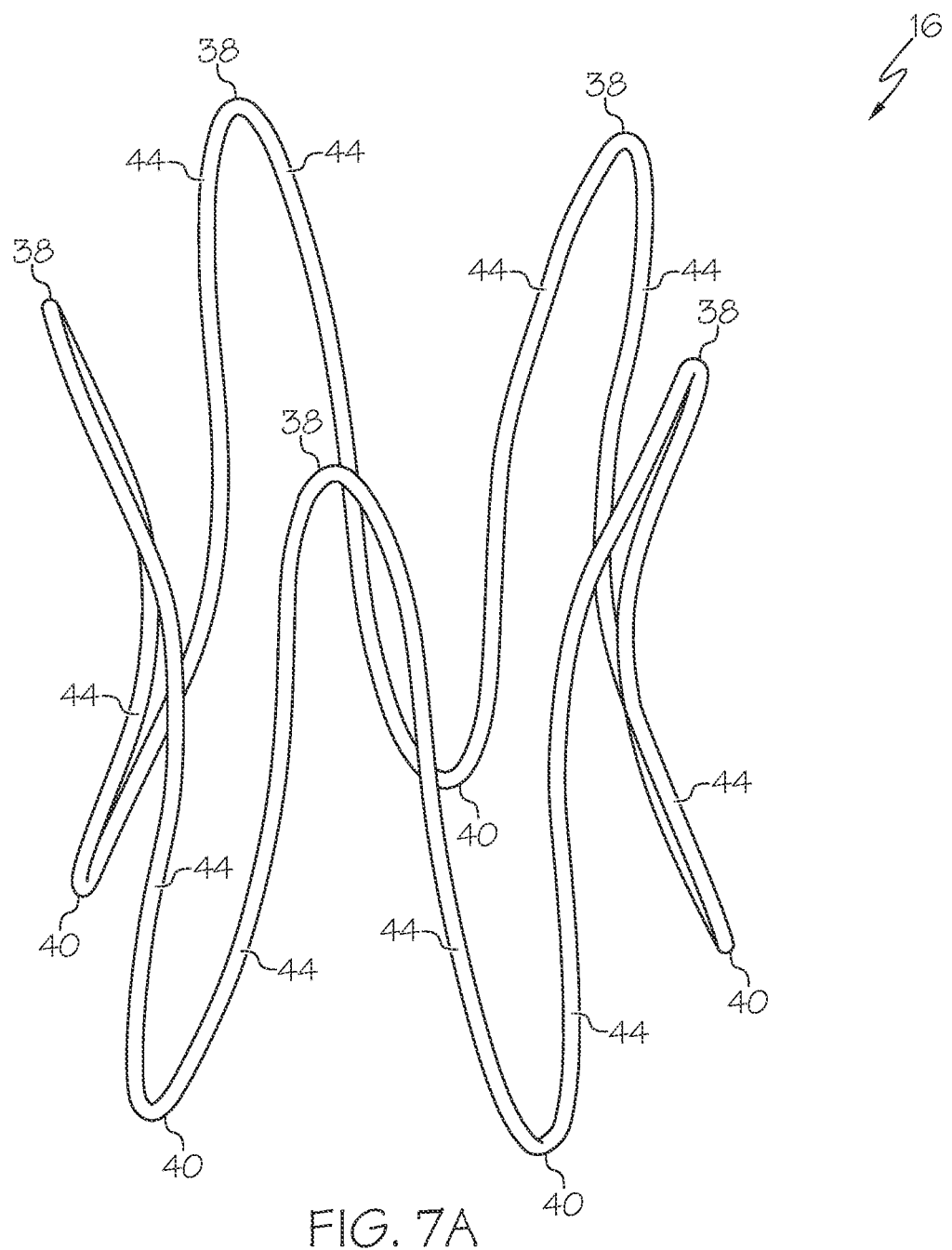
FIG. 7A is a perspective of an expansor, illustrating the expansor in a generally expanded orientation in accordance with another embodiment of the present invention.
Figure 7B:
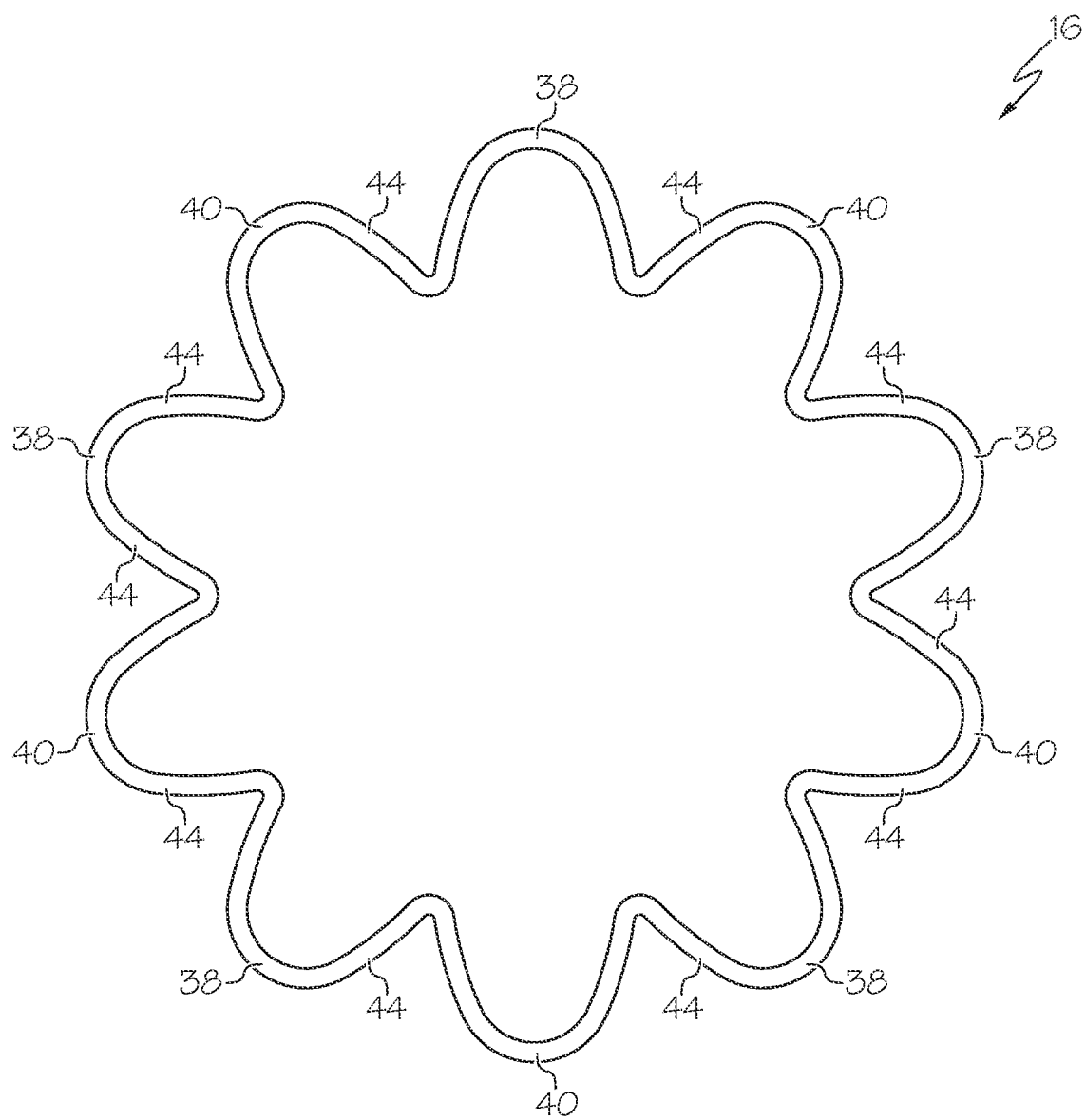
FIG. 7B is a top view of the expansor of FIG. 7A.
Figure 8A:
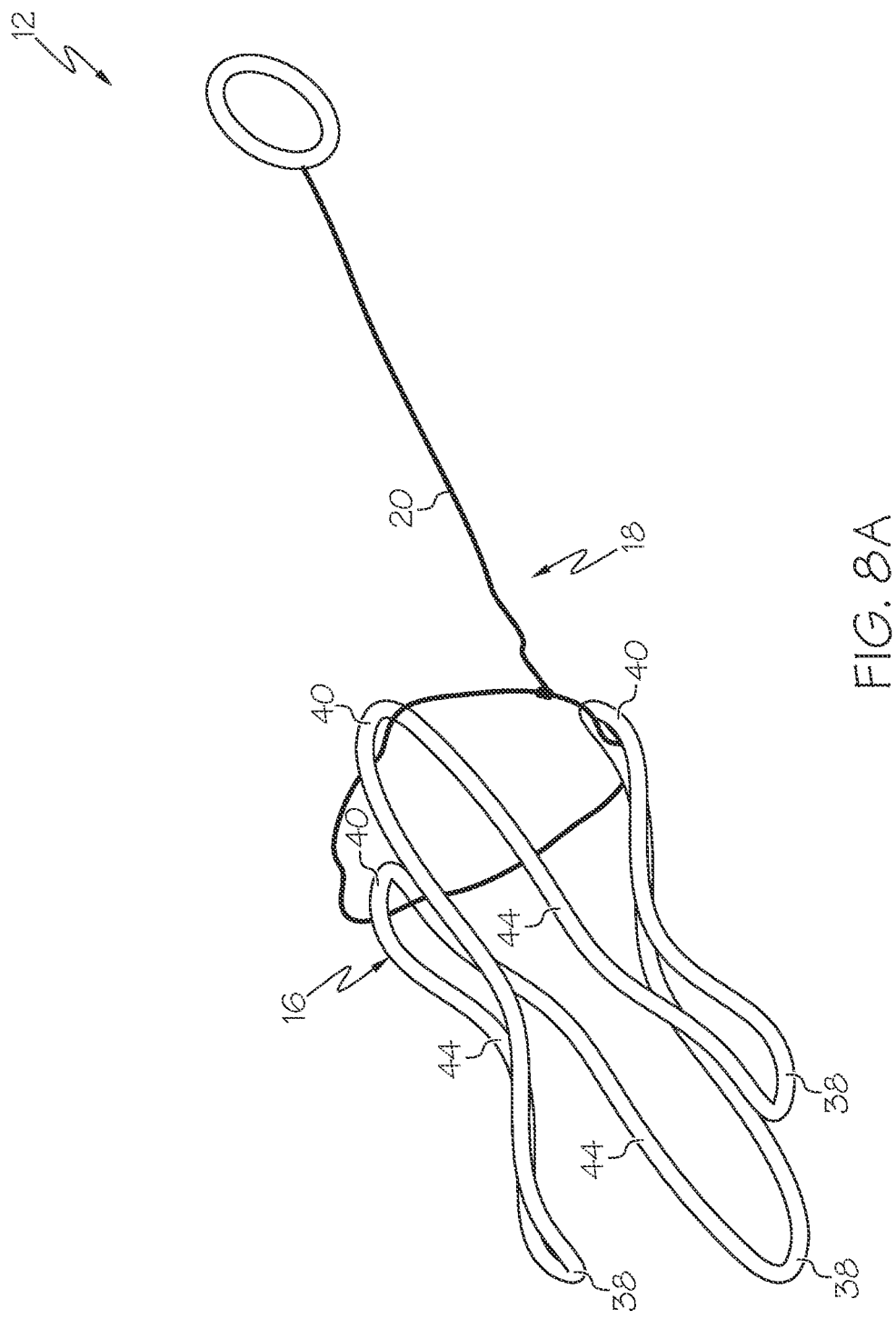
FIG. 8A is a perspective view of the speculum including an expansor and an extraction mechanism in accordance with another embodiment of the present invention.
Figure 8B:
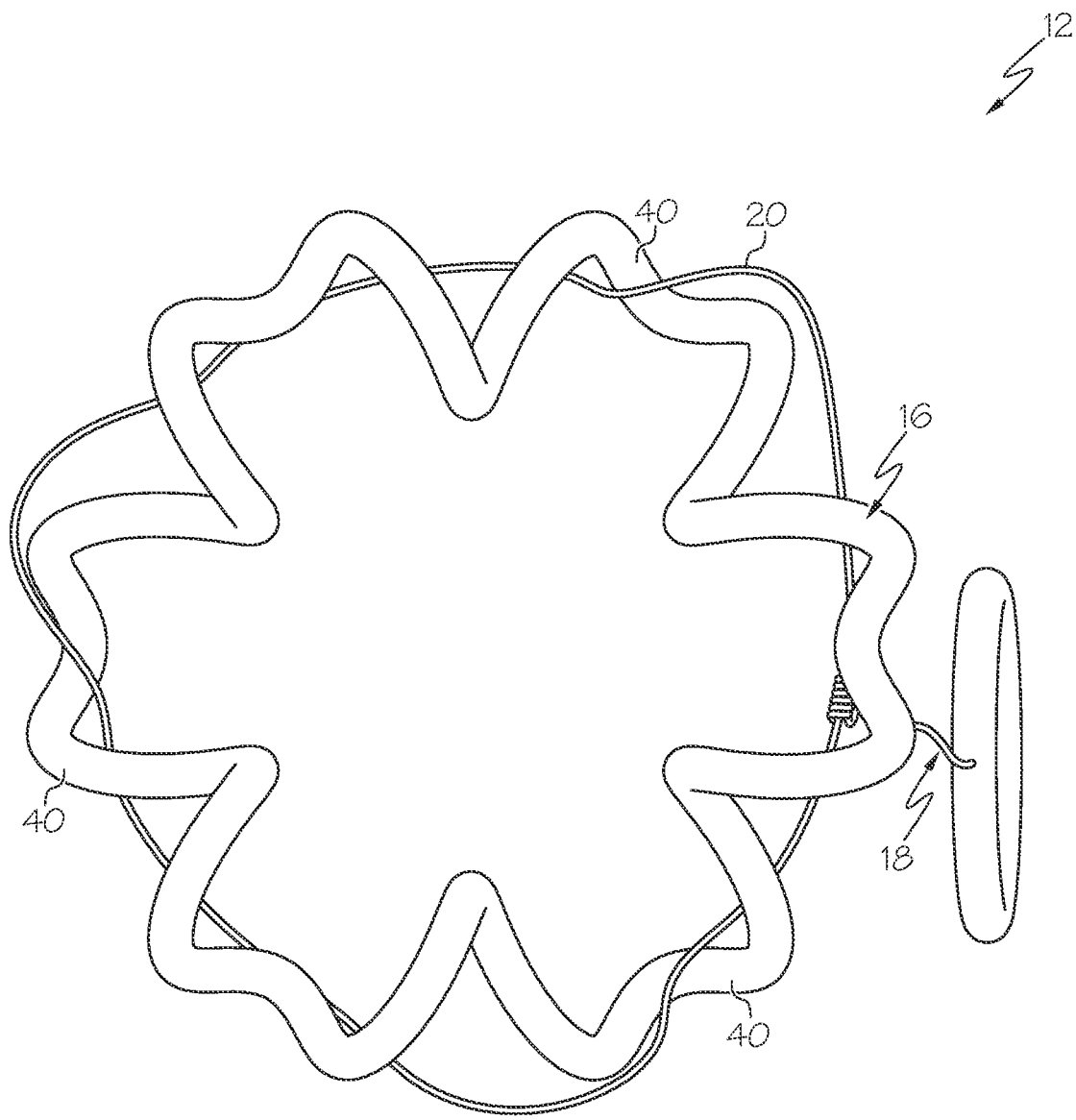
FIG. 8B is a top view of the speculum of FIG. 8A.

According to one embodiment, the expansor 16 may take the shape, including those as shown in FIGS. 7A and 7B, and may or may not include any loops 42. Even when the expansor 16 does not include loops 42, the expansor 16 may be connected to the extraction mechanism 18 in the manner as shown in FIGS. 8A and 8B. For example, when the expansor 16 has distal transition portions 38 and proximal transition portions 40 without loops, the drawstring 20 of the extraction mechanism 18 may be looped or threaded through the valleys created by the proximal transition portions 40 of the expansor 16. As further demonstrated in FIGS. 7A-8B, the longitudinal sections 44 may take on a curved or contoured shape.

The speculum assembly 10 described herein has many benefits in addition to those discussed above. In the medical context, a physician is not required to manage a tool while inspecting a patient. Using this speculum assembly 10, a physician can simply insert the expansor 16 into the patient and have both hands available to inspect and examine the patient. In other scenarios, the patient may insert the expansor 16 themselves, for example prior to the physician or other healthcare practitioner entering the room to conduct a gynecological exam. Moreover, because the speculum assembly 10 is optionally disposable and easily disinfected, the speculum assembly 10 may be useful in those areas which struggle to access medical instruments.

From the accompanying materials, it will be seen that the invention is one well adapted to attain all the ends and objects set forth herein with other advantages which are obvious and which are inherent to the structure. It will be understood that certain features and subcombinations are of utility and may be employed without reference to other features and subcombinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described in the accompanying materials and illustrated in the drawings are presented by way of example only and are not intended to limit the concepts and principles of the present invention. Thus, there has been shown and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifica-

What is claimed is:

1. A speculum comprising:
an expansor comprising:
a plurality of proximal transition portions;
a plurality of distal transition portions; and
a plurality of generally longitudinal sections, each longitudinal section extending between a respective proximal transition portion and distal transition portion;
wherein the expansor is configured to exert an outward force against an orifice into which it is inserted; and
wherein, upon insertion into the orifice, the expansor is configured to gradually expand to an expanded state, and wherein the expanded state is dependent upon a size and a force exerted by the orifice.

2. The speculum of claim 1, wherein the expansor is configured to gradually expand the orifice upon insertion into the orifice.

3. The speculum of claim 2, wherein the expansor is configured to retain the orifice in an orifice expanded state, wherein the orifice expanded state is dependent upon the size and the force exerted by the orifice.

4. The speculum of claim 1, wherein at least the longitudinal sections of the expansor are configured to directly contact and engage a wall of the orifice.

5. The speculum of claim 1, wherein the expansor is configured for transitioning between a compressed state wherein the expansor has a first cross section having a first cross-sectional area and a partially expanded state wherein the expansor has a second cross section having a second cross-sectional area, and wherein the second cross-sectional area is greater than the first cross-sectional area.

6. The speculum of claim 5, wherein the expansor is further configured for transitioning to an equilibrium state wherein the expansor has a third cross section having a third cross-sectional area, and wherein the third cross-sectional area is greater than the second cross-sectional area.

7. The speculum of claim 1, wherein the expansor forms a radial compression spring that can be radially compressed when an inward radial force is exerted thereon.

8. The speculum of claim 1, wherein the speculum is adapted for being delivered via an assembly comprising a plunger, and wherein the plunger is adapted for being at least in a partially retracted position when the expansor is being inserted into the orifice.

9. The speculum of claim 1, wherein gradual expansion of the expansor continues until the expansor reaches an equilibrium, and wherein the equilibrium is based at least in part on the size and the force exerted by the orifice.

10. A speculum comprising:
an expansor comprising:
a plurality of proximal transition portions;
a plurality of distal transition portions; and
a plurality of generally longitudinal sections, each longitudinal section extending between a respective proximal transition portion and distal transition portion; and
an extraction mechanism that, when engaged, reduces a cross section of only a lower portion of the expansor, wherein the lower portion adopts a generally frusto-conical profile when the extraction mechanism is engaged, and wherein the cross section of the lower portion is smaller than a cross section of an upper portion of the expansor;
wherein the expansor is configured to exert an outward force against an orifice into which it is inserted; and
wherein, upon insertion into the orifice, the expansor is configured to gradually expand to an expanded state, and wherein the expanded state is dependent upon a size and a force exerted by the orifice.

11. The speculum of claim 10, wherein the extraction mechanism includes a drawstring that, when pulled, engages the proximal transition portions and reduces a cross section of only the lower portion of the expansor.

\* \* \* \* \*